(12) United States Patent
Jang et al.

(10) Patent No.: US 6,356,462 B1
(45) Date of Patent: Mar. 12, 2002

(54) SOFT-SWITCHED FULL-BRIDGE CONVERTERS

(75) Inventors: Yungtaek Jang, Apex; Milan M. Jovanovic, Cary, both of NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/775,636

(22) Filed: Feb. 5, 2001

Related U.S. Application Data

(63) Continuation-in-part of application No. 09/652,869, filed on Aug. 31, 2000.

(51) Int. Cl.[7] .............................................. H02M 3/335
(52) U.S. Cl. ........................................ 363/17; 363/132
(58) Field of Search .............................. 363/16, 17, 56, 363/98, 131, 132

(56) References Cited

U.S. PATENT DOCUMENTS

| | | | |
|---|---|---|---|
| 5,132,889 A | | 7/1992 | Hitchcock et al. ............ 363/17 |
| 6,016,258 A | * | 1/2000 | Jain et al. ..................... 363/17 |
| 6,147,886 A | * | 11/2000 | Wittenbreder ............. 363/17 X |
| 6,246,599 B1 | * | 6/2001 | Jang et al. ................... 363/132 |

OTHER PUBLICATIONS

J. Sabate et al, "Design Considerations for High–Voltage High–Power Full–Bridgee Zero–Voltage–Switched PWM Converter," IEEE Applied Power Electronics Conf. Proc., 1990, pp. 275–284, (No Month).

G. Hua et al, "An Improved Full–Bridge Zero–Voltage–Switched PWM Converter Using a Saturable Inductor," IEEE Power Electronics Specialists' Conf. Rec., 1991, pp. 189–194, No Month.

* cited by examiner

*Primary Examiner*—Jessica Han
(74) *Attorney, Agent, or Firm*—Venable

(57) ABSTRACT

A family of soft-switched, full-bridge pulse-width-modulated (FB PWM) converters provides zero-voltage-switching (ZVS) conditions for the turn-on of the bridge switches over a wide range of input voltage and output load. The FB PWM converters of this family achieve ZVS with the minimum duty cycle loss and circulating current, which optimizes the conversion efficiency. The ZVS of the primary switches is achieved by employing two magnetic components whose volt-second products change in the opposite directions with a change in phase shift between the two bridge legs. One magnetic component always operates as a transformer, where the other magnetic component can either be a coupled inductor, or uncoupled (single-winding) inductor. The transformer is used to provide isolated output(s), whereas the inductor is used to store the energy for ZVS.

9 Claims, 19 Drawing Sheets

SOFT-SWITCHED FULL-BRIDGE CONVERTERS

CROSS REFERENCE TO RELATED APPLICATION

This is continuation-in-part of patent application Ser. No. 09/652,869, filed on Aug. 31, 2000.

BACKGROUND OF THE INVENTION

1. Field of the Invention

This invention relates to isolated dc/dc converters, and more particularly, to the constant-frequency, isolated dc/dc full-bridge converters that operate with ZVS of the primary-side switches in a wide range of input voltage and load current.

2. Description of the Prior Art

The major factors hindering the operation of conventional ("hard-switched") pulse-width-modulated (PWM) converters at higher switching frequencies are circuit parasitics such as semiconductor junction capacitances, transformer leakage inductances, and rectifier reverse recovery. Generally, these parasites introduce additional switching losses and increase component stresses, and, consequently, limit the maximum frequency of operation of "hard-switched" converters. To operate converters at higher switching frequencies and, eventually, achieve higher power densities, it is necessary to eliminate, or at least reduce, the detrimental effects of parasitics without a degradation of conversion efficiency. The most effective approach in dealing with parasitics is to incorporate them into the operation of the circuit so that the presence of parasitics does not affect the operation and performance of the circuit. Generally, this incorporation of parasitics can be accomplished by two techniques: the resonant techniques and constant-frequency PWM soft-switching techniques.

The common feature of the resonant techniques is the employment of a resonant tank that is used to shape the current and voltage waveforms of the semiconductor switch (es) to create conditions for either zero-current turn-off, or zero-voltage turn-on. However, zero-current switching (ZCS), or zero-voltage switching (ZVS) in resonant-type converters is achieved at the expense of increased current and/or voltage stresses of semiconductors compared to the stresses in the corresponding "hard-switched" topologies. In addition, the majority of resonant topologies need to circulate a significant amount of energy to create ZCS or ZVS conditions, which increases conduction losses. This strong trade-off between the switching-loss savings and increased conduction losses may result in a lower efficiency and/or larger size of a high-frequency resonant-type converter compared to its PWM counterpart operating at a lower frequency. This is often the case in applications with a wide input-voltage range. In addition, variable frequency of operation is often perceived as a disadvantage of resonant converters. As a result, although resonant converters are used in a number of niche applications such as those with pronounced parasitics, the resonant technique has never gain a wide acceptance in the power-supply industry in high-frequency high-power-density applications.

To overcome some of the deficiencies of the resonant converters, primarily increased current stresses and conduction losses, a number of techniques that enable constant-frequency PWM converters to operate with ZVS, or ZCS have been proposed. In these soft-switching PWM converters that posses the PWM-like square-type current and voltage waveforms, lossless turn-off or turn-on of the switch (es) is achieved without a significant increase of the conduction losses. Due a relatively small amount of the circulating energy required to achieve soft switching, which minimizes conduction losses, these converters have potential of attaining high efficiencies at high frequencies.

One of the most popular soft-switched PWM circuit is the soft-switched, full-bridge (FB) PWM converter shown in FIG. 1(a), which is discussed in the article "Design Considerations for High-Voltage High-Power Full-Bridge Zero-Voltage-Switched PWM Converter," by J. Sabate et al., published in *IEEE Applied Power Electronics Conf. (APEC) Proc.*, pp. 275–284, 1990. This converter features ZVS of the primary switches at a constant switching frequency with a reduced circulating energy. The control of the output voltage at a constant frequency is achieved by the phase-shift technique. In this technique the turn-on of a switch in the $Q_3$–$Q_4$ leg of the bridge is delayed, i.e., phase shifted, with respect to the turn-on instant of the corresponding switch in the $Q_1$–$Q_2$ leg, as shown in FIG. 1(b). If there is no phase-shift between the legs of the bridge, no voltage is applied across the primary of the transformer and, consequently, the output voltage is zero. On the other hand, if the phase shift is 180°, the maximum volt-second product is applied across the primary winding, which produces the maximum output voltage. In the circuit in FIG. 1(a), the ZVS of the lagging-leg switches $Q_3$ and $Q_4$ is achieved primarily by the energy stored in output filter inductor $L_F$. Since the inductance of $L_F$ is relatively large, the energy stored in $L_F$ is sufficient to discharge output parasitic capacitances $C_3$ and $C_4$ of switches $Q_3$ and $Q_4$ in the lagging leg and to achieve ZVS even at very light load currents. However, the discharge of the parasitic capacitances $C_1$ and $C_2$ of leading-leg switches $Q_1$ and $Q_2$ is done by the energy stored in leakage inductance $L_{LK}$ of the transformer because during the switching of $Q_1$, or $Q_2$ the transformer primary is shorted by the simultaneous conduction of rectifiers $D_1$ and $D_2$ that carry the output filter inductor current. Since leakage inductance $L_{LK}$ is small, the energy stored in $L_{LK}$ is also small so that ZVS of $Q_1$ and $Q_2$ is hard to achieve even at relatively high output currents. The ZVS range of the leading-leg switches can be extended to lower load currents by intentionally increasing the leakage inductance of the transformer and/or by adding a large external inductance in series with the primary of the transformer. If properly sized, the external inductance can store enough energy to achieve ZVS of the leading-leg switches even at low currents. However, a large external inductance also stores an extremely high energy at the full load, which produces a relatively large circulating energy that adversely affects the stress of the semiconductor components, as well as the conversion efficiency.

In addition, a large inductance in series with the primary of the transformer extends the time that is need for the primary current to change direction from positive to negative, and vice verse. This extended commutation time results in a loss of duty cycle on the secondary of the transformer, which further decreases the conversion efficiency. Namely, to provide full power at the output, the secondary-side duty-cycle loss must be compensated by reducing the turns ratio of the transformer. With a smaller transformer's turns ratio, the reflected output current into the primary is increased, which increases the primary-side conduction losses. Moreover, since a smaller turns ratio of the transformer increases the voltage stress on the secondary-side rectifiers, the rectifiers with a higher voltage rating that typically have higher conduction losses may be required.

Finally, it should be noted that one of the major limitations of the circuit in FIG. 1(a) is a severe parasitic ringing at the secondary of the transformer during the turn-off of a rectifier. This ringing is cased by the resonance of the rectifier's junction capacitance with the leakage inductance of the transformer and the external inductance, if any. To control the ringing, a heavy snubber circuit needs to be used on the secondary side, which may significantly lower the conversion efficiency of the circuit.

The ZVS range of the leading-leg switches in the FB ZVS-PWM converter in FIG. 1(a) can be extended to lower load currents without a significant increase of the circulating energy by using a saturable external inductor instead of the linear inductor, as described in the article "An Improved Full-Bridge Zero-Voltage-Switched PWM Converter Using a Saturable Inductor," by G. Hua et al., published in *IEEE Power Electronics Specialists'Conf. Rec.*, pp. 189–194, 1991, and in U.S. Pat. No. 5,132,889, "Resonant-Transition DC-to-DC Converter," by L. J. Hitchcock et. al., issued on Jul. 21, 1992. However, even with the modifications, the performance of these converters is far from optimal.

An FB ZVS-PWM converter that achieves ZVS of the primary switches in the entire load and line range with virtually no loss of secondary-side duty cycle and with minimum circulating energy was described in patent application Ser. No. 09/652,869, filed Aug. 31, 2000 by Jang and Jovanović and assigned to the assignee of this application. This converter, shown in FIG. 2, employs a primary-side coupled inductor to achieve a wide-range ZVS. The two windings of the coupled inductor are connected in series and their common terminal is connected to one end of the primary winding of the transformer, which has the other end of the primary winding connected to the ground. The other two terminals of the coupled inductor are connected to the midpoint of the two bridge legs through a corresponding blocking capacitor. The secondary side can be implemented with any type of the full-wave rectifier such, for example, the full-wave rectifier with a center-tap secondary, the full-wave rectifier with current doubler, or the full-bridge full-wave rectifier. The output voltage regulation in the converter is achieved by employing a constant-frequency phase-shift control as in the circuit in FIG. 1(a).

The circuit in FIG. 2 utilizes the energy stored in the magnetizing inductance of the coupled inductor to discharge the capacitance across the switch that is about to be turned on and, consequently, achieve ZVS. By properly selecting the value of the magnetizing inductance of the coupled inductor, the primary switches in the converter in FIG. 2 can achieve ZVS even at no load. This feature is quite different from the characteristics of the conventional FB ZVS where the capacitances of the lagging-leg switches are discharge by the energy stored in the output filter inductor, whereas the discharge of the capacitances of the leading-leg switches is done by the energy stored in the leakage inductance of the transformer or external inductance. Because in the circuit in FIG. 2 the energy required to create ZVS conditions at light loads does not need to be stored in the leakage inductance, the transformer leakage inductance can be minimized. As a result, the loss of the duty cycle on the secondary-side is minimized, which maximizes the turns ratio of the transformer and, consequently, minimizes the conduction losses. In addition, the minimized leakage inductance of the transformer significantly reduces the secondary-side ringing caused by the resonance between the leakage inductance and junction capacitance of the rectifier, which greatly reduces the power dissipation of a snubber circuit that is usually used to damp the ringing.

In this invention, the concept employed to achieve ZVS of the primary switches in the converter in FIG. 2 is generalized. The generalized concept is used to derive a family of FB ZVS converters with the same characteristics.

SUMMARY OF THE INVENTION

The present invention discloses a family of isolated, constant-frequency, phase-shift-modulated FB ZVS-PWM converters that provide ZVS of the bridge switches in a wide range of input voltage and load current. Generally, the converters of this family employ two transformers that are connected to the bridge legs so that a change in the phase shift between the two legs of the bridge increases the volt-second product on the windings of one transformer and decreases the volt-second product on the windings of the other transformer. By connecting a load circuit to the secondary winding(s) of one transformer and by regulating the output of the load circuit, the energy stored in a properly selected magnetizing inductance of the other transformer can be used for creating ZVS conditions. Specifically, as the load current and/or input voltage decreases, the phase shift between the bridge legs changes so that the volt-second product on the windings of the transformer connected to the load also decreases. At the same time, the volt-second product on the windings of the other transformer increases, which increases the energy stored in the magnetizing inductance of the transformer. Therefore, since available energy for ZVS stored in the magnetizing inductance increases as the load current and/or input voltage decreases, the circuits of the present invention can achieve ZVS in a very wide range of input voltage and load current, including no load.

Since the energy used to create the ZVS condition at light loads is not stored in the leakage inductances of the transformer, the transformer's leakage inductances can be minimized, which also minimizes the duty-cycle loss on the secondary side of the transformer. As a result, the converters of this invention can operate with the largest duty cycle possible, thus minimizing both the conduction loss of the primary switches and voltage stress on the components on the secondary side of the transformer, which improves the conversion efficiency. Moreover, because of the minimized leakage inductances, the secondary-side parasitic ringing caused by a resonance between the leakage inductances and the junction capacitance of the rectifier is also minimized so that the power dissipation of a snubber circuit usually required to damp the ringing is also reduced.

The circuits of the present invention can be either implemented as dc/dc converters, or dc/ac inverters. If implemented as dc/dc converters, any type of the secondary-side rectifier can be employed such, for example, the full-wave rectifier with a center-tap secondary winding, full-wave rectifier with current doubler, or a full-bridge full-wave rectifier. In addition, in some embodiments of the present invention, the transformer that is not connected to the load circuit reduces to a single winding inductor.

DETAILED DESCRIPTION OF THE PREFERRED EMBODIMENT OF THE INVENTION

Figure 3:
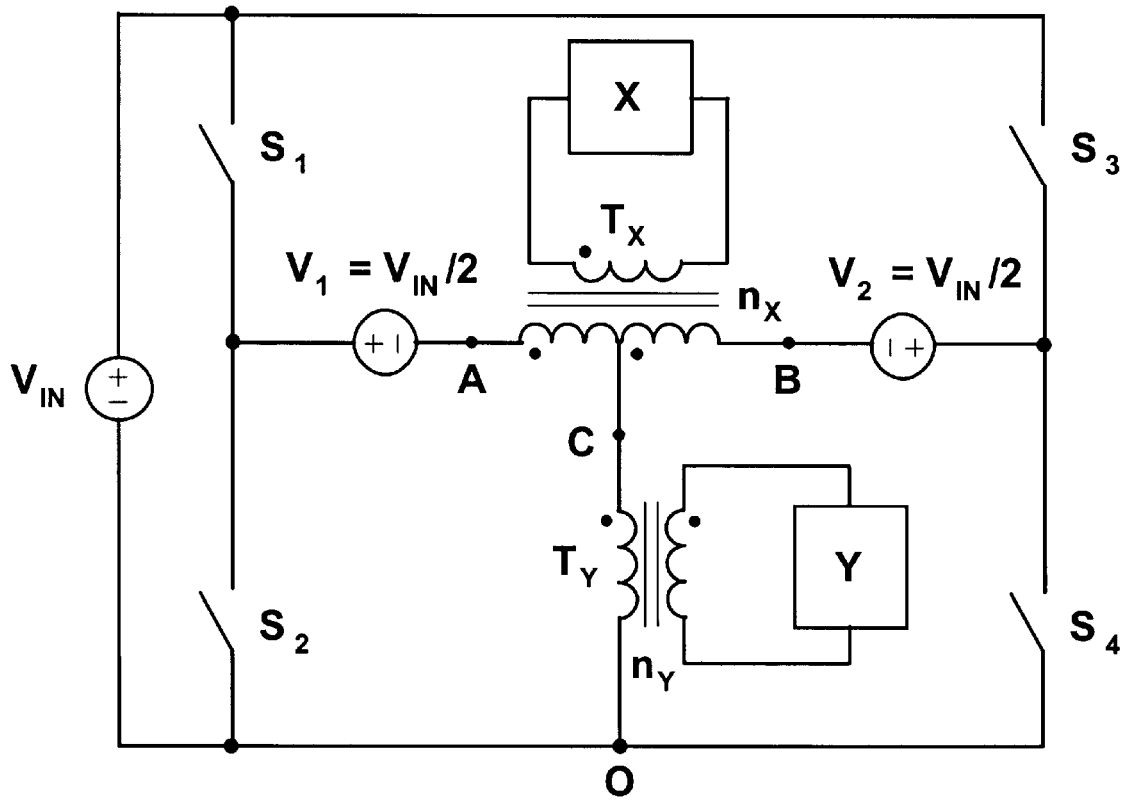
FIG. 3 shows a generalized embodiment of the full-bridge ZVS-PWM converter of this invention.

FIG. 3 shows one of the generalized embodiments of the isolated, phase-shift-controlled FB ZVS-PWM converter of this invention. The circuit in FIG. 3, employs two transformers TX and TY, which have their respective secondary outputs connected to two output circuits X and Y. Generally, in the dc/dc implementations of the converter in FIG. 3, each output circuit X and Y includes a rectifier, low-pass filter, and load, whereas in the dc/ac (inverter) applications each output circuit X and Y consists only of a combination of a load and filter. Two constant voltage sources $V_1$ and $V_2$, connected in series with the primary winding of transformer TX, are employed to provide the volt-second balance on the windings of both transformers so that the transformers do not saturate.

Figure 4:
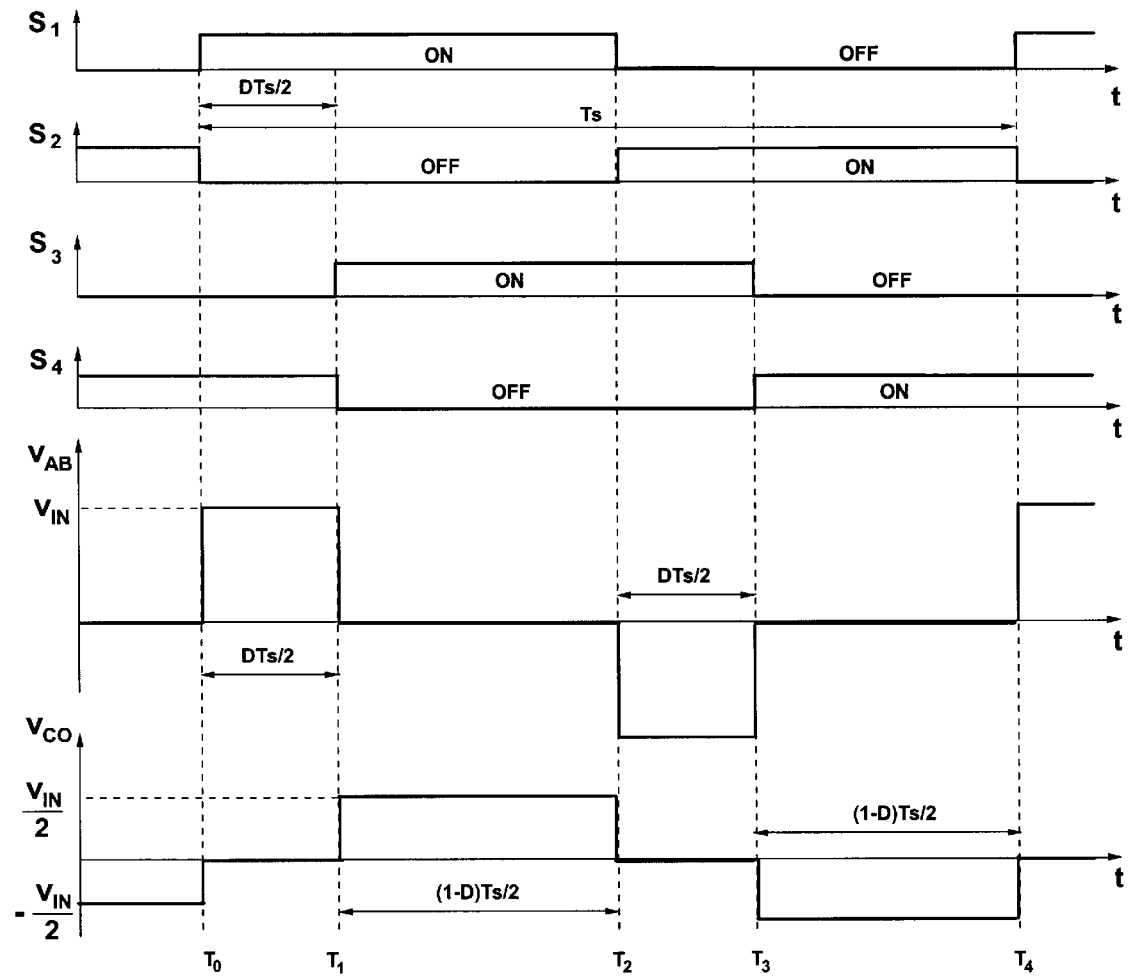
FIG. 4 shows the control timing diagrams of the switches and the voltages across the primary windings of transformers TX and TY (voltages $V_{AB}$ and $V_{CO}$, respectively).

Generally, the volt-second products of the windings of transformers X and Y in the circuit in FIG. 3 are dependent on the phase-shift between the turn-on instances of the corresponding switches in bridge legs $S_1$–$S_2$ and $S_3$–$S_4$, as illustrated in FIG. 4. Namely, for the zero phase shift, i.e., when switches $S_1$ and $S_2$ and their corresponding switches $S_3$ and $S_4$ are turned on and off in unison (D=0 in FIG. 4), voltage $V_{AB}$ across the primary of transformer TX is zero. As a result, for the zero phase shift, the volt-second product of the primary winding of transformer TX is also zero. At the same time, since voltage $V_{AC}$ across winding AC must be equal to voltage $V_{CB}$ across winding CB because windings AC and CB have the same number of turns, and since $V_{AB}=V_{AC}+V_{CB}=0$, it follows that $V_{AC}=V_{BC}=0$. As a result, voltage $V_{CO}$ across the primary winding of transformer TY is $V_{IN}/2$, i.e., the volt-second product of the primary winding of this transformer is maximal. Similarly, when switches $S_1$ and $S_2$ and their corresponding switches $S_3$ and $S_4$ are turned on and off in antiphase, i.e., with a 180° phase shift (D=1 in FIG. 4), the volt-second product on the primary of transformer TX is maximal, whereas the volt-second product of the primary winding of transformer TY is zero (minimal). Because the output voltages of output circuits X and Y are directly proportional to the volt-second products of the corresponding primary windings, the circuit in FIG. 3 delivers power to outputs X and Y in a complementary fashion. Specifically, for zero phase shift (D=0), the maximum power is delivered to output Y, whereas no power (or minimal power) is delivered to output X. For 180° phase shift (D=1), the maximum power is delivered to output X, whereas no power is delivered to output Y.

Because the incremental changes of the delivered power to outputs X and Y with phase-shift changes are in opposite directions, the circuit in FIG. 3 cannot simultaneously regulate both outputs if constant-frequency control is employed. Nevertheless, the property of the circuit to deliver power to outputs X and Y in the complementary fashion makes the circuit ideal for implementing ZVS of the primary switches in a wide range of input voltage and load current. Namely, as already explained, the conventional FB ZVS-PWM converter has difficulties achieving ZVS of the leading-leg switches. Specifically, as the load decreases the energy available for discharging the capacitance of the leading-leg switch that is about to be turned on, which is stored in the leakage inductance of the transformer and any seriesly connected external inductance, is decreasing as the load decreases. If in the converter in FIG. 3 one output is regulated, the energy in that output will decease as the load decreases. At the same time, the energy stored in the magnetizing inductance of the associated transformer will also decrease because a lighter load requires a smaller volt-second product on the primary winding of the transformer. However, the energy in the other, unregulated, output circuit and in the magnetizing inductance of the corresponding transformer will increases because of an increased volt-second product on the primary of the transformer. This increased energy in the unregulated output circuit and in the magnetizing inductance of its transformer can be used to create the ZVS condition for the primary switches at lighter loads, including no load.

Figure 5:
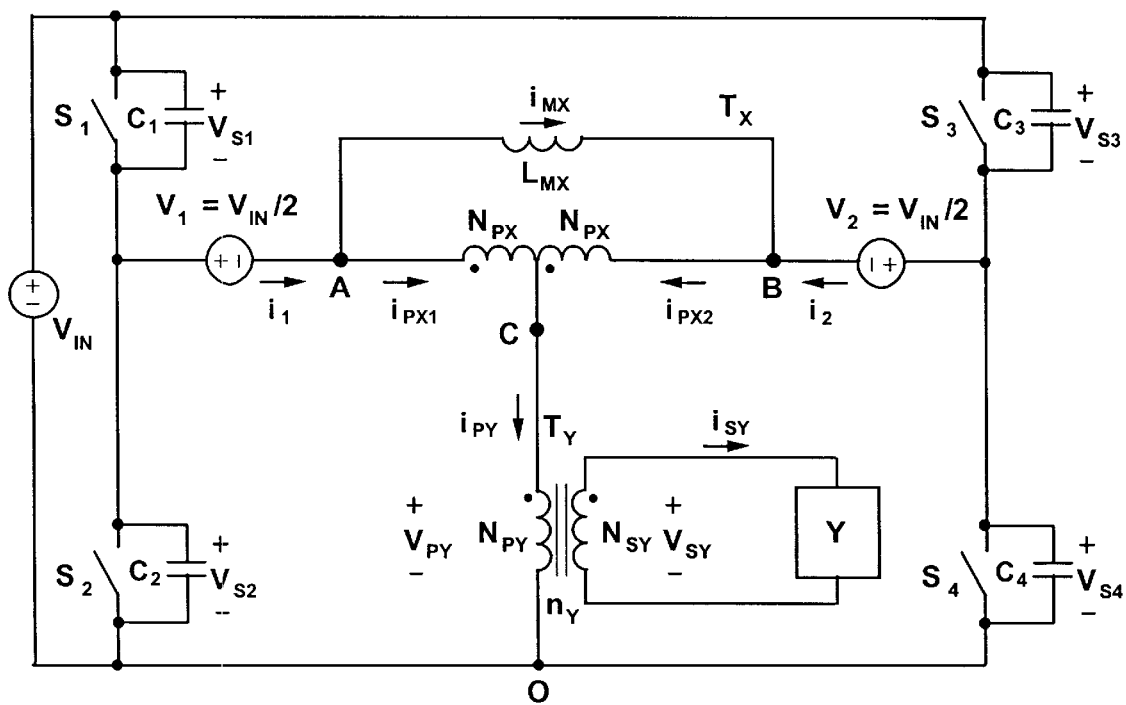
FIG. 5 shows a simplified circuit diagram of the converter in FIG. 3 when output Y is regulated.

To facilitate the analysis of the operation of the circuit in FIG. 3, FIG. 5 shows its simplified circuit diagram when output Y is regulated. In the simplified circuit in FIG. 5, it is assumed that only energy stored in the magnetizing inductance of transformer TX of the unregulated output is used to create the ZVS condition. Because no energy stored in output circuit X is used to create the ZVS condition, output circuit X and the associated secondary of transformer X are not shown in FIG. 5. In fact, since in the circuit in FIG. 5 only the primary windings of transformer TX are used, transformer TX operates as a coupled inductor. Generally, this simplification does not have a significant effect on the operation of the circuit. Namely, if energy stored in output circuit X is used for ZVS in addition to the energy stored in the magnetizing inductance of transformer TX, the only effect of output circuit X is to increase the total available energy that can be used for creating the ZVS condition. However, due to a reduced component count, the implementation in FIG. 5 is preferred in practice.

The further simplified the analysis, it is assumed that the resistance of the conducting semiconductor switches is zero, whereas the resistance of the non-conducting switches is infinite. In addition, the leakage inductances of both transformers are neglected since their effect on the operation of the circuit is not significant. Finally, the magnetizing inductance of transformer TY of the regulated output is also neglected since it does not have a significant effect on the operation of the circuit (although the energy stored in this inductance could be used to assist ZVS at heavier loads). However, the magnetizing inductance of transformer TX, which operates as a coupled inductor, and output capacitances of primary switches $C_1$–$C_4$ are not neglected in this analysis since they play a major roll in the operation of the circuit. Consequently, in FIG. 5, transformer TX is modeled as an ideal transformer with magnetizing inductance $L_{MX}$ connected across the series connection of primary windings AC, whereas transformer TY is modeled only by an ideal transformer with turns ratio $n_Y$. It should be noted that magnetizing inductance $L_{MX}$ of transformer TX represents the inductance measured between terminals A and B.

With reference to FIG. 5, the following relationships between currents can be established:

$$i_{PY} = i_{PX1} + i_{PX2}, \quad (1)$$

$$N_{PY}i_{PY} = N_{SY}i_{SY}, \quad (2)$$

$$i_1 = i_{PX1} + i_{MX} \quad (3)$$

$$i_2 = i_{PX2} - i_{MX} \quad (4)$$

Since the number of turns of winding AC and winding CB of transformer TX are the same, it must be that $$i_{PX1} = i_{PX2}. \quad (5)$$

Substituting Eq. (5) into Eqs. (1)–(4) gives $$i_{PX1} = i_{PX2} = \frac{i_{SY}}{2n_Y}, \quad (6)$$

$$i_1 = \frac{i_{SY}}{2n_Y} + i_{MX}, \quad (7)$$

$$i_2 = \frac{i_{SY}}{2n_Y} - i_{MX}, \quad (8)$$

where $n_Y = N_{PY}/N_{SY}$ is the turns ratio of transformer TY.

As can be seen from Eqs. (7) and (8), currents of both bridge legs $i_1$ and $i_2$ are composed of two components: load-current component $i_{SY}/2n_Y$ and magnetizing-current component $i_{MX}$. The load-current component is directly depended on the load current, whereas the magnetizing current does not directly depend on the load, but rather on the volt-second product across the magnetizing inductance. Namely, a change of the magnetizing current with a change in the load current occurs only if the phase shift is changed to maintain the output regulation. Usually, the change of the phase shift with the load change is greater at light loads, i.e., as the load decreases toward no load, than at heavier loads. Since in the circuit in FIG. 5 the phase shift increases as the load approaches zero, the volt-second product of $L_{MX}$ also increases so that the circuit in FIG. 5 exhibits the maximum magnetizing current at no load, which makes possible to achieve ZVS at no load.

Because magnetizing current $i_{MX}$ does not contribute to the load current, but flows between the two bridge legs, as seen in FIG. 5, it represents a circulating current. Generally, this circulating current and its associated energy should be minimized to reduce losses and maximize the conversion efficiency. Due to an inverse dependence of the volt-second product of $L_{MX}$ on the load current, circuit in FIG. 5 circulates less energy at the full load than at a light load, and, therefore, features ZVS in a wide load range with a minimum circulating current.

Figure 6:
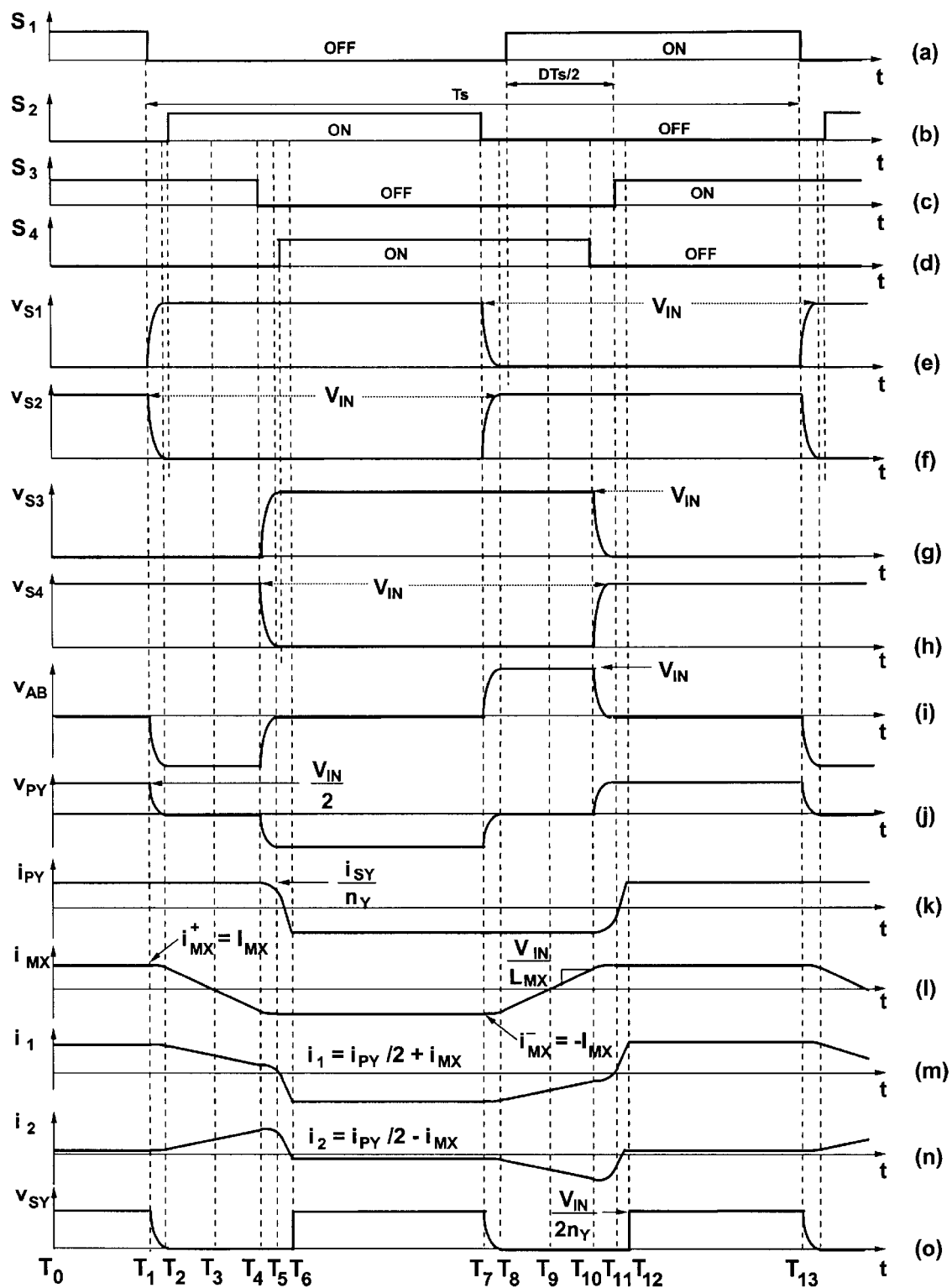
FIG. 6 shows the key current and voltage waveforms of the circuit in FIG. 5.

To further understand the operation of the circuit in FIG. 5, FIG. 6 shows its key current and voltage waveforms when the circuit is implemented as a dc/dc converter. The waveforms in FIG. 6 are obtained based on the analysis described in patent application Ser. No. 09/652,869 that assumes that output circuit Y comprises a low-pass LC filter, which has a large filter inductance $L_F$ so that during a switching cycle the reflected load current into the primary of transformer TY is constant, as shown in waveform (k) in FIG. 6. As can bee seen from waveforms (m) and (n) in FIG. 6, for all four primary switches $S_1$ through $S_4$ the magnitude of the current flowing trough the switch at the turn-off moment is the same, i.e., $$|i_1(T_1)| = |i_2(T_4)| = |i_1(T_7)| = |i_2(T_{10})| = \left|\frac{i_{PY}}{2}\right| + |I_{MX}|, \quad (9)$$

where, $I_{MX}$ is the amplitude of the magnetizing current $i_{MX}$.

According to Eq. (9), the commutation of the switches in both legs, during which the capacitance of the turned-off switch is charging (voltage across the switch is increasing) and the capacitance of the switch that is about to be turned on is discharging (voltage across the switch is decreasing), is done by the energy stored by both primary current $i_{PY}$ and magnetizing current $i_{MX}$. While the commutation energy contributed by magnetizing current $i_{MX}$ is always stored in magnetizing inductance $L_{MX}$ of transformer TX, the commutation energy contributed by current $i_{PY}$ is stored either in the filter inductance (not shown in FIG. 5) of output circuit Y, or leakage inductances (not shown in FIG. 5) of transformers TX and TY. Specifically, for leading-leg switches $S_1$ and $S_2$, the commutation energy contributed by $i_{PY}$ is stored in output-filter inductor $L_F$, whereas for lagging-leg switches $S_3$ and $S_4$ it is stored in the leakage inductance of the transformers. Since it is desirable to minimize the leakage inductance of transformer TY to minimize the secondary-side parasitic ringing, the energy stored in its leakage inductances is relatively small, i.e., much smaller than the energy stored in output-filter inductance. As a result, in the circuit in FIG. 3, it is easy to achieve ZVS of leading-leg switches $S_1$ and $S_2$ in the entire load range, whereas ZVS of the lagging-leg switches $S_3$ and $S_4$ requires a proper sizing of the magnetizing inductance $L_{MX}$ since at light loads almost entire energy required to create the ZVS condition of lagging-leg switches $S_3$ and $S_4$ is stored in the magnetizing inductance.

Figure 7:
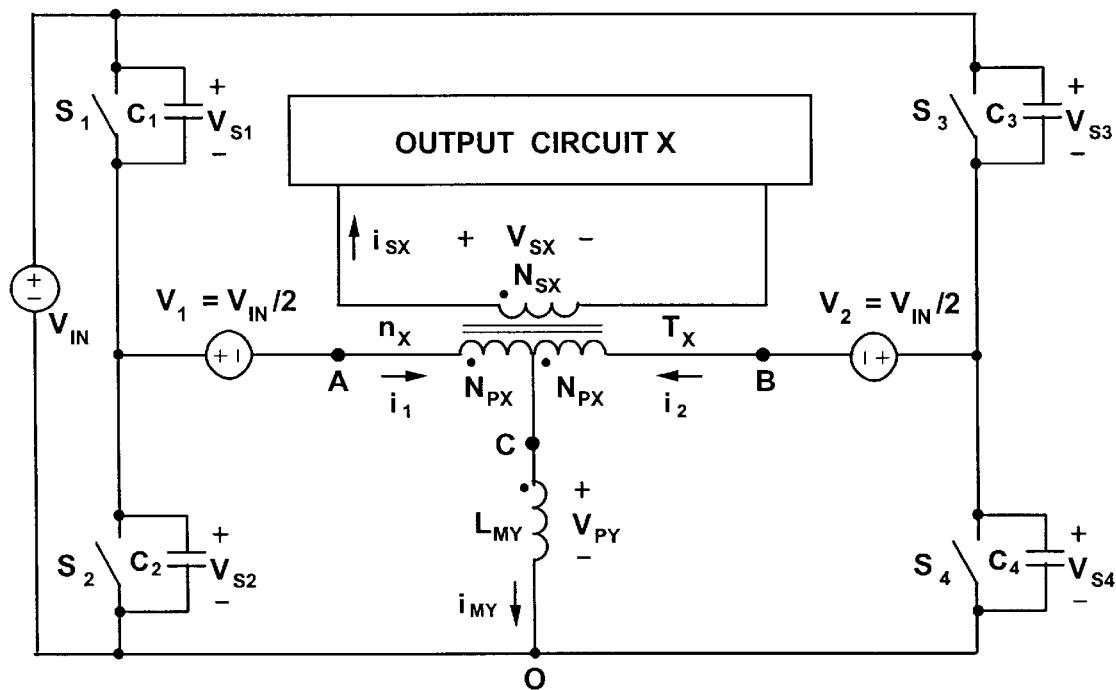
FIG. 7 shows a simplified circuit diagram of the converter in FIG. 3 when output X is regulated.

A similar analysis can be performed by assuming that output X of the circuit in FIG. 3 is regulated. A simplified circuit diagram when output X is regulated is shown in FIG. 7. In the simplified circuit in FIG. 7, it is assumed that only energy stored in the magnetizing inductance of transformer TY of the unregulated output is used to create the ZVS condition. Because no energy stored in output circuit Y is used to create the ZVS condition, output circuit Y is not shown in FIG. 7. Furthermore, because of the absence of output circuit Y, transformer TY operates with the open secondary winding, i.e., only the primary winding of the transformer is involved in the operation of the circuit. Therefore, in the circuit in FIG. 7, transformer TY operates as an inductor. In the simplified circuit in FIG. 7, this inductor is modeled by inductance $L_{MY}$. Also, in FIG. 7, the magnetizing inductance of transformer TX is neglected because it has no important roll in the operation of the circuit. Generally, this simplification does not have a significant effect on the operation of the circuit. Namely, if energy stored in output circuit Y is used for ZVS in addition to the energy stored in the magnetizing inductance of transformer TY, the only effect of output circuit Y is to increase the total available energy that can be used for creating ZVS condition. However, due to a reduced component count, the implementation in FIG. 7 is preferred in practice.

With reference to FIG. 7, the following relationships between currents can be established:

$$N_{PX}i_1 - N_{PX}i_2 - N_{SX}i_{SX} = 0 \tag{10}$$

$$i_{MY} = i_1 + i_2 \tag{11}$$

Solving Eqs. (10) and (11) for $i_1$ and $i_2$ gives $$i_1 = \frac{i_{MY}}{2} + \frac{i_{SX}}{2n_X}, \tag{12}$$

$$i_2 = \frac{i_{MY}}{2} - \frac{i_{SX}}{2n_X}. \tag{13}$$

where $n_{X=NPX}/N_{SX}$ is the turns ratio of transformer TX.

As can be seen from Eqs. (12) and (13), currents of both bridge legs $i_1$ and $i_2$ are composed of two components: load-current component $i_{SX}/2n_X$ and magnetizing-current component $i_{MY}/2$. The load-current component is directly depended on the load current, whereas the magnetizing current does not directly depend on the load, but rather on the volt-second product across the magnetizing inductance. Namely, a change of the magnetizing current with a change in the load current occurs only if the phase shift is changed to maintain the output regulation. Usually, the change of the phase shift with the load change is greater at light loads, i.e., as the load decreases toward no load, than at heavier loads. Moreover, since in the circuit in FIG. 7 the phase shift decreases as the load approaches zero, the volt-second product of $L_{MY}$ also increases so the circuit in FIG. 7 exhibits the maximum magnetizing current at no load, which makes possible ZVS at no load.

As can be seen from FIG. 7, magnetizing current $i_{MY}$ does not contribute to the load current because one-half of this current flows through primary windings AC and CB of transformer X in opposite directions. Therefore, current $i_{MY}$ represents a circulating current that should be minimized. Due to an inverse dependence of the volt-second product of $L_{MY}$ on the load current, the circuit in FIG. 7, likewise the circuit in FIG. 5, circulates less energy at full load than at light load, and, therefore, features ZVS in a wide load range with a minimum circulating current.

Figure 8:
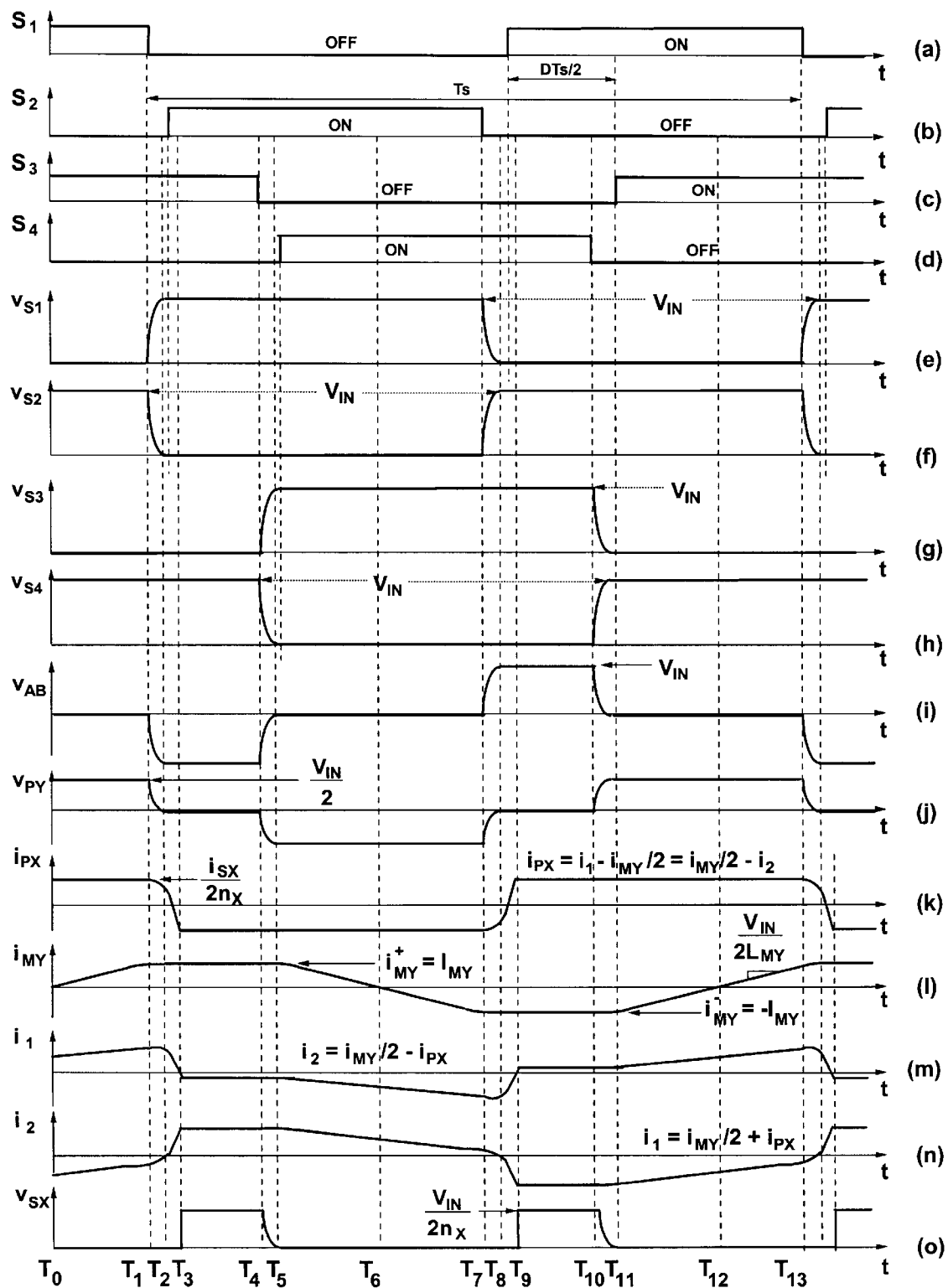
FIG. 8 shows the key current and voltage waveforms of circuit in FIG. 7.

FIG. 8 shows key current and voltage waveforms of the circuit in FIG. 7, when the circuit is implemented as a dc/dc converter. The waveforms in FIG. 8 are obtained by assuming that output circuit X comprises a low-pass LC filter, which has a large filter inductance $L_F$ so that during a switching cycle the reflected load current into the primary of transformer TX is constant, as shown in waveform (k) in FIG. 8. As can be seen from waveforms (m) and (n) in FIG. 8, for all four primary switches $S_1$ through $S_4$ the magnitude of the current flowing trough the switch at the turn-off moment is the same, i.e., $$|i_2(T_1)| = |i_1(T_4)| = |i_2(T_7)| = |i_1(T_{10})| = \left|\frac{i_{SX}}{2n_X}\right| + \left|\frac{I_{MY}}{2}\right|, \tag{14}$$

where, $I_{MY}$ is the amplitude of the magnetizing current $i_{MY}$.

However, it should be noted that opposite from the implementation in FIG. 5, in the implementation in FIG. 7 the energy for creating the ZVS condition of the lagging-leg switches are $S_3$ and $S_4$ is stored in the output filter inductor, whereas the energy for creating the ZVS condition of leading-leg switches are $S_1$ and $S_2$ is stored in the leakage inductances of transformer TX and inductance $L_{MY}$. Therefore, in the circuit in FIG. 7, it is harder to achieve ZVS of the leading-leg switches than the legging-leg switches. In fact, since all energy for zero-voltage commutation of leading-leg switches $S_1$ and $S_2$ is stored in inductance $L_{MY}$, to achieve ZVS of the leading-leg switches in a wide load range requires a proper sizing of the magnetizing inductance $L_{MY}$.

Figure 9:
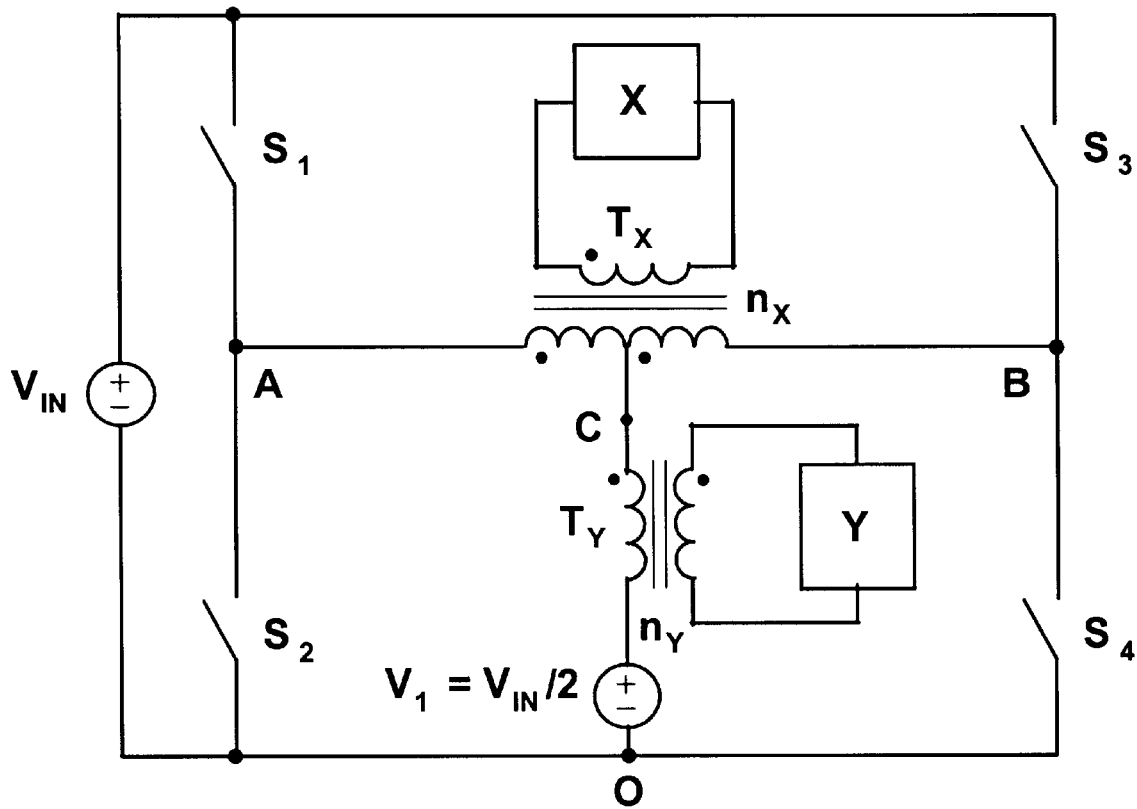
FIG. 9 is another generalized embodiment of the full-bridge ZVS-PWM converter of this invention.
Figure 10:
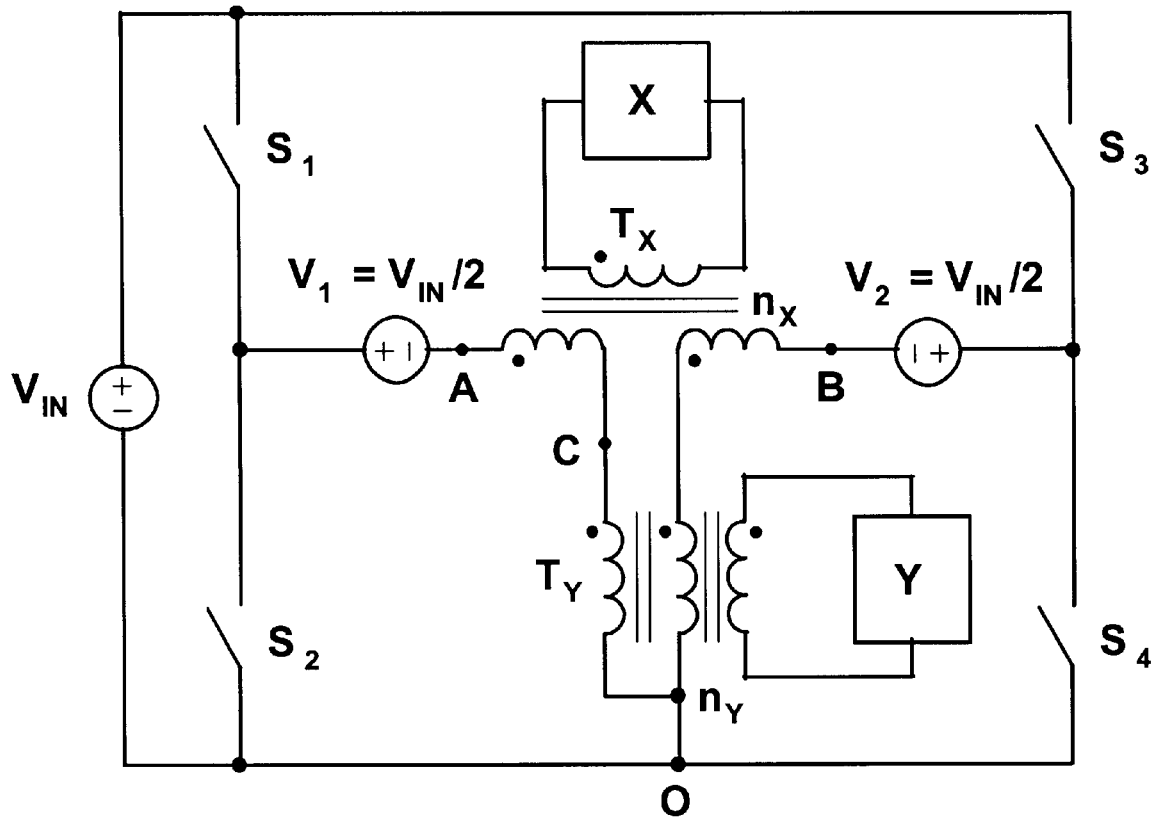
FIG. 10 is another generalized embodiment of the circuit in FIG. 3 obtained by splitting the primary winding of transformer TY.
Figure 11:
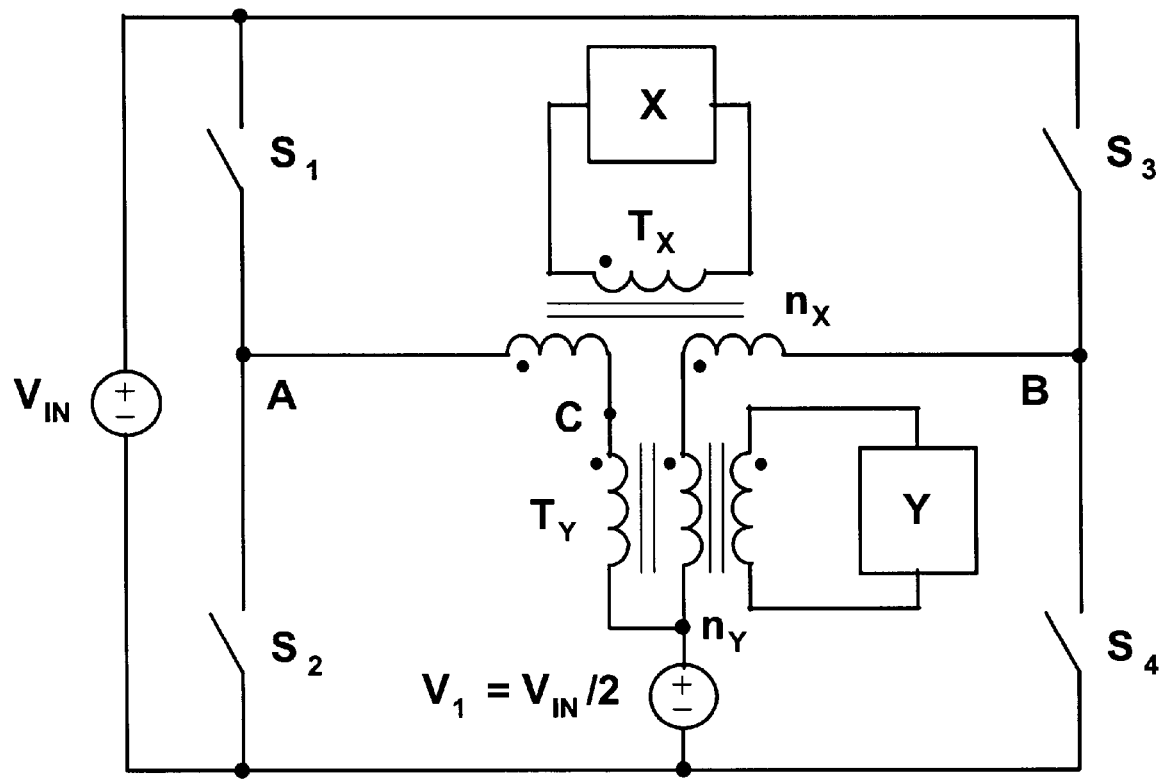
FIG. 11 is another generalized embodiment of the circuit in FIG. 9 obtained by splitting the primary winding of transformer TY.

Other generalized embodiments of the isolated, phase-shift-controlled FB ZVS-PWM converter of this invention are shown in FIGS. 9, 10, and 11. The operation and characteristics of the generalized circuits in FIGS. 9, 10, and 11, are identical to those of the circuit in FIG. 3. In fact, the circuit in FIG. 9 is obtained by shifting of voltage sources $V_1$ and $V_2$ from the respective primaries of transformer TX into the primary of transformer TY. Since this circuit transformation does not change any of the circuit's branch currents and node voltages, it also does not change the waveforms of the circuit. Circuits in FIGS. 10 and 11 are obtained from the circuits in FIGS. 3 and 9, respectively, by splitting the primary winding of transformer Y. Since this transformation also does not change any of the circuit's branch currents and node voltages, the operation of all generalized circuits shown in FIGS. 3, 9, 10, and 11 is identical.

According to the generalized embodiments shown in FIGS. 3, 9, 10, and 11, a number of FB ZVS-PWM converter circuits can be derived. FIGS. 12 through 17 shows some examples of these circuits implemented as dc/dc converters. It should be noted that other implementations, or variations of the shown implementations are possible. Specifically, the presented generalized circuits and their implementations can be implemented as dc/ac inverters, as well.

Figure 1:
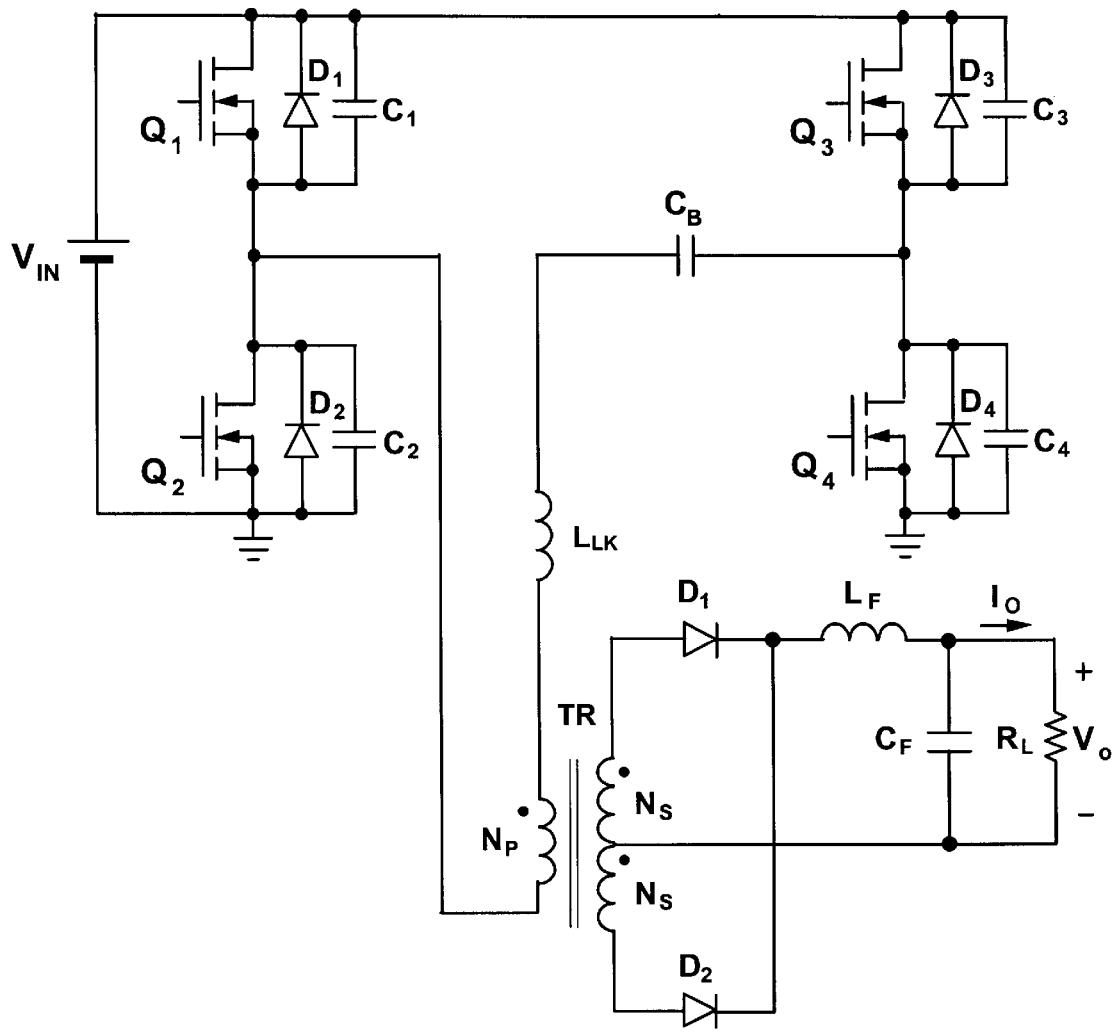
FIGS. 1a and b show the conventional full-bridge ZVS-PWM converter: (a) circuit diagram of power stage; (b) gate-signal timing diagrams. (prior art).
Figure 1:
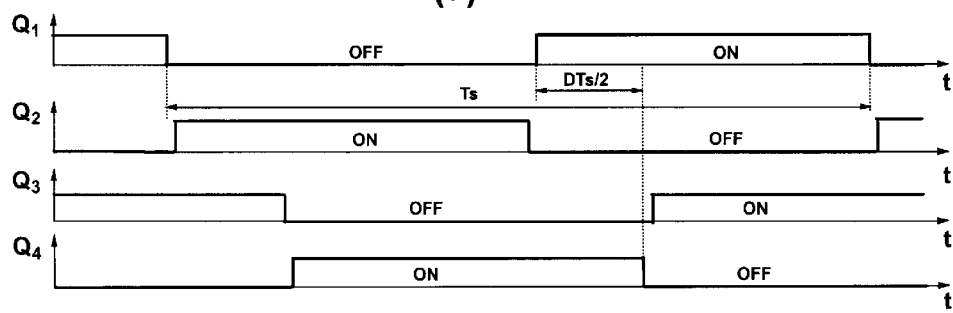
Figure 2:
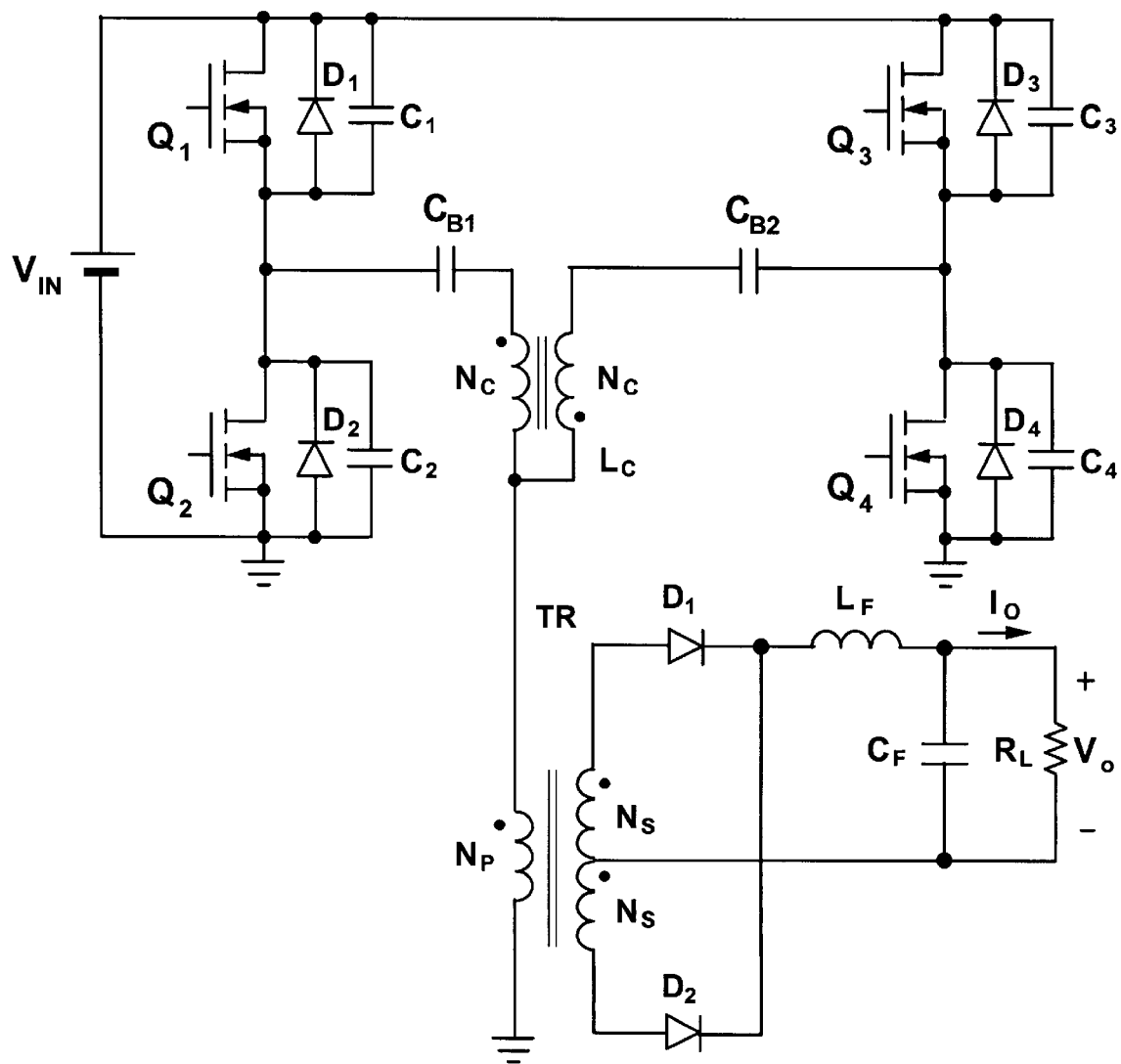
FIG. 2 shows the improved full-bridge ZVS-PWM converter with wide ZVS range.
Figure 12:
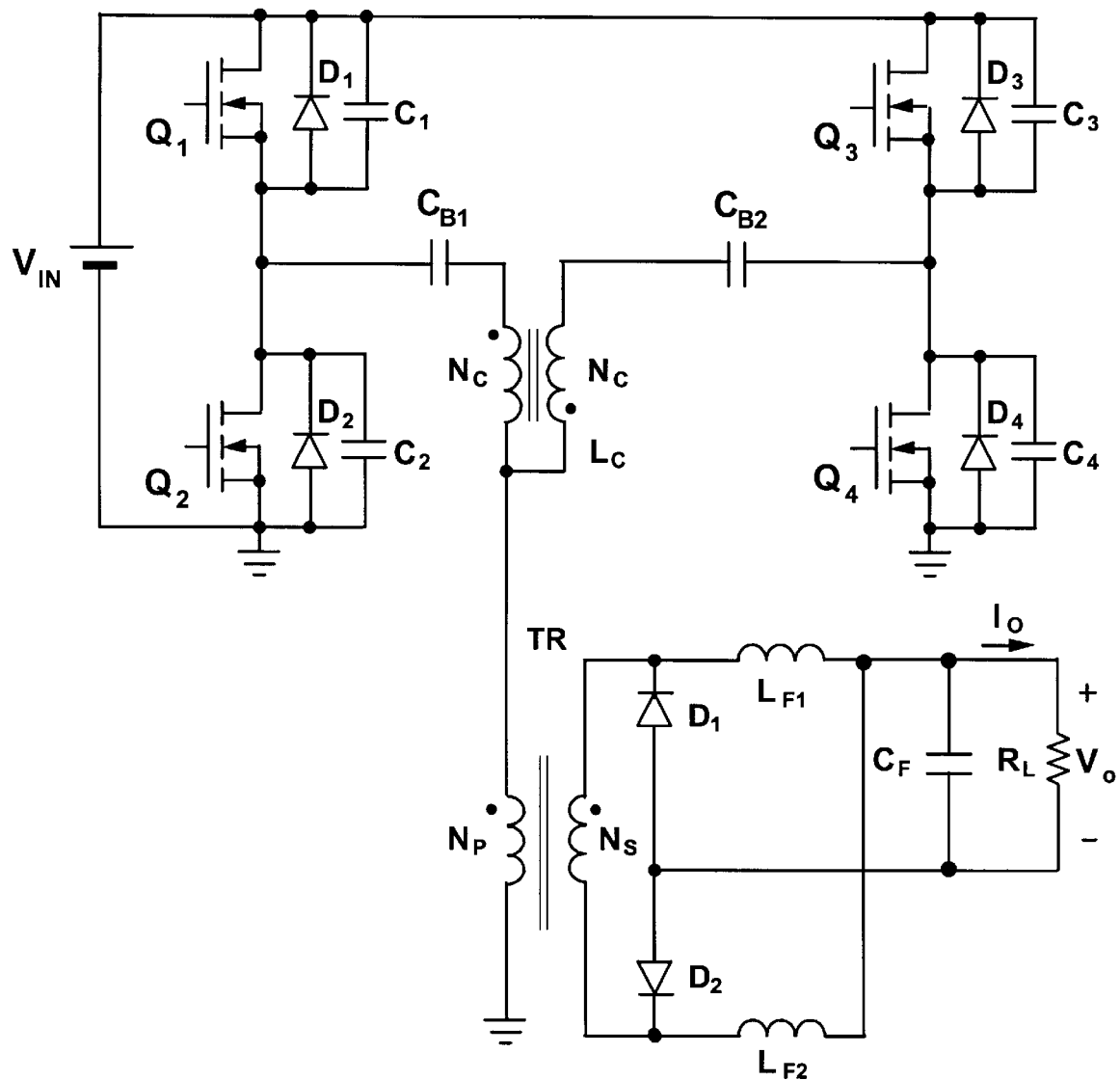
FIG. 12 shows the implementation of the dc/dc FB ZVS-PWM converter derived from the circuit in FIG. 3 when output Y is regulated.

The circuit in FIG. 12 is derived from the circuit in FIG. 3 by implementing output circuit Y with the current-doubler rectifier. Transformer TX of the unregulated output is implemented as coupled inductor $L_C$, whereas voltage sources $V_1$ and $V_2$ are implemented with capacitors $C_{B1}$ and $C_{B2}$, respectively. Namely, if capacitors $C_{B1}$ and $C_{B2}$ are large enough so that the resonant frequency of the series resonant circuit formed by these capacitors and the magnetizing inductance of $L_C$ is much smaller than the switching frequency than the voltage across capacitors is constant and equal to $V_{IN}/2$. It also should be noted that the circuit in FIG. 12 could be also implemented with other types of the secondary-side rectifier circuit such, for example, the full-wave rectifier, as shown in FIG. 2.

Figure 13:
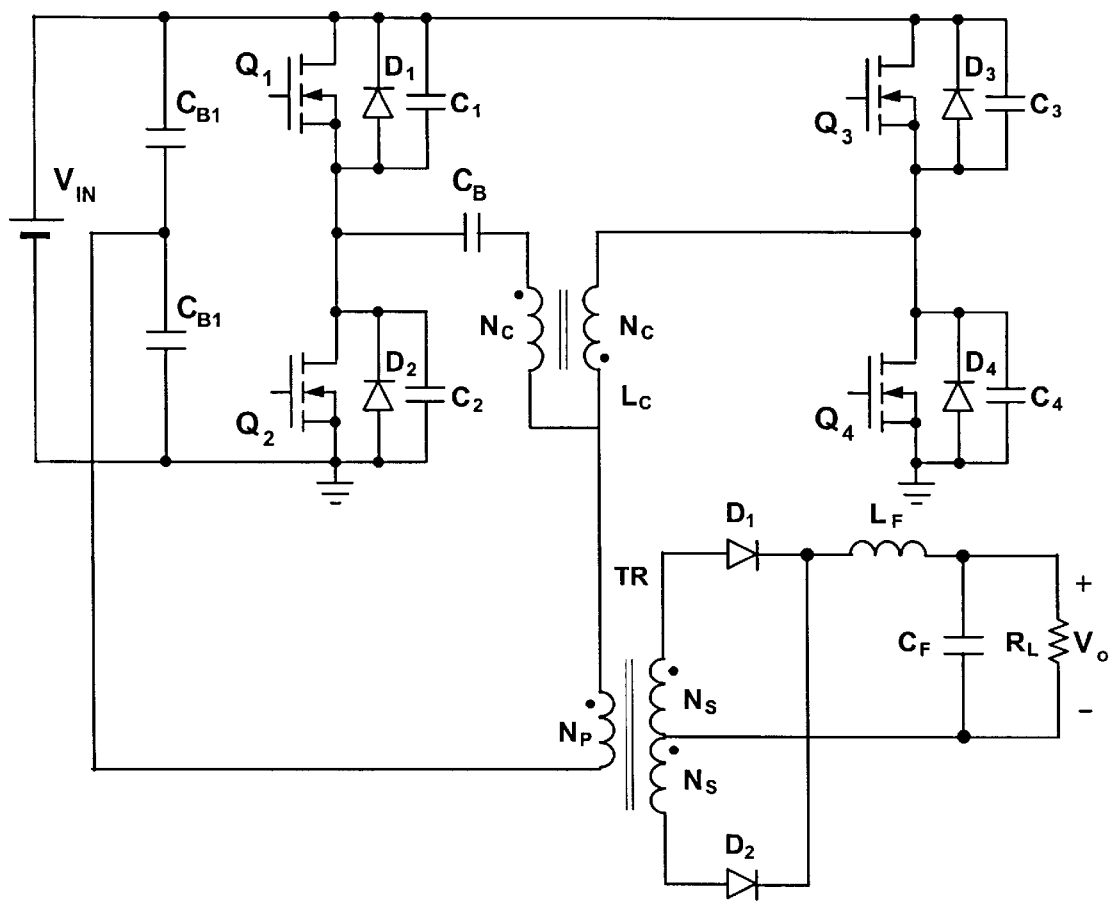
FIG. 13 shows implementation of dc/dc FB ZVS-PWM converter derived from the circuit in FIG. 9 when output Y is regulated.

FIG. 13 shows an embodiment of the circuit in FIG. 9. In this embodiment voltage source $V_1$ is implemented by splitting the rail voltage with two capacitors $C_{B1}$. Theoretically, capacitor $C_B$, which serves to prevent the saturation of transformer TX if the switching waveforms of the bridge legs are not identical, is not necessary. However, it is always used in practice. Generally, the voltage across capacitor $C_B$ is small (close to zero) since this capacitor only takes on the voltage difference caused by a mismatching of the bridge legs, which is usually small.

Figure 14:
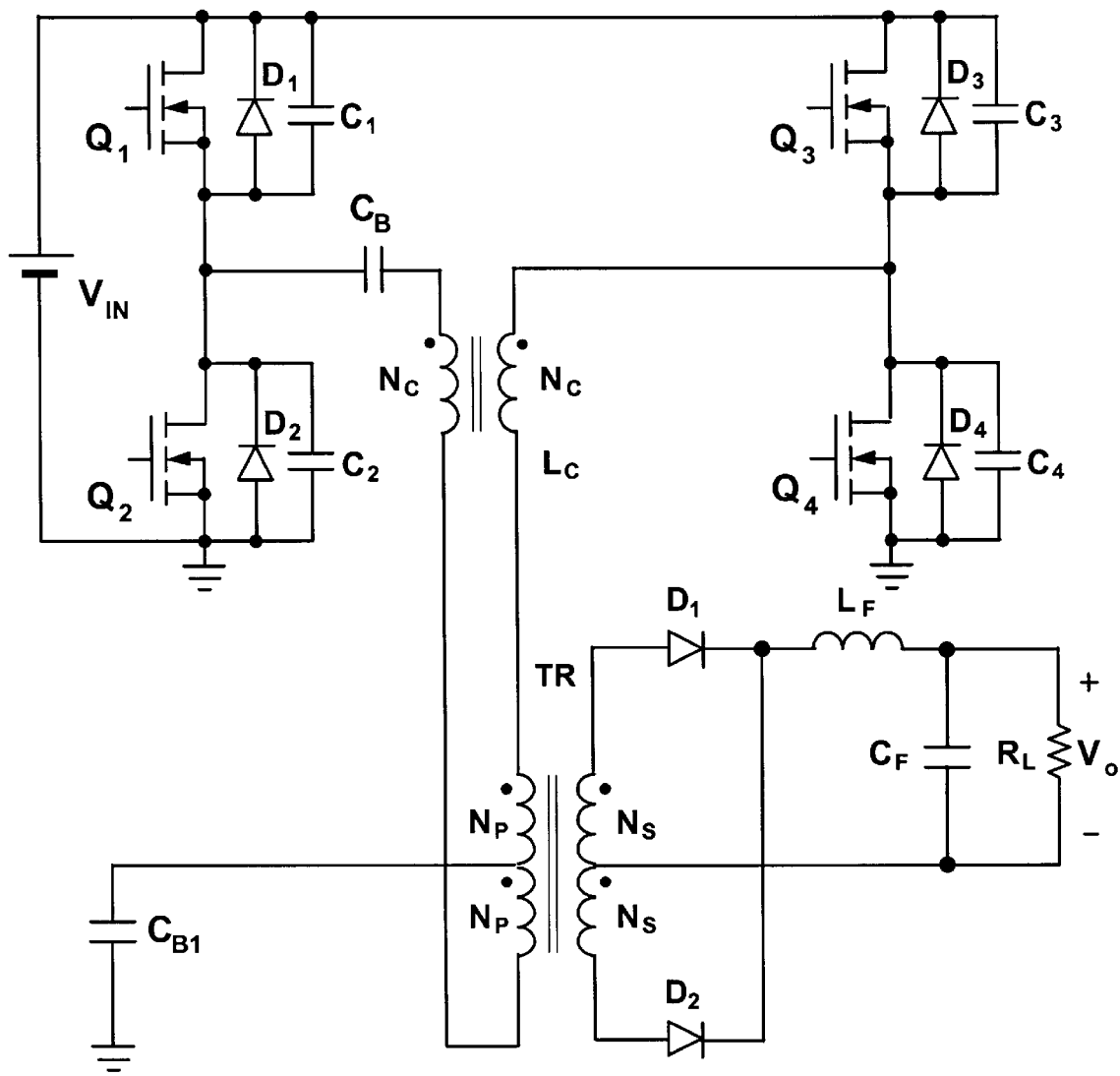
FIG. 14 shows the implementation of the dc/dc FB ZVS-PWM converter derived from the circuit in FIG. 11 when output X is regulated.
Figure 15:
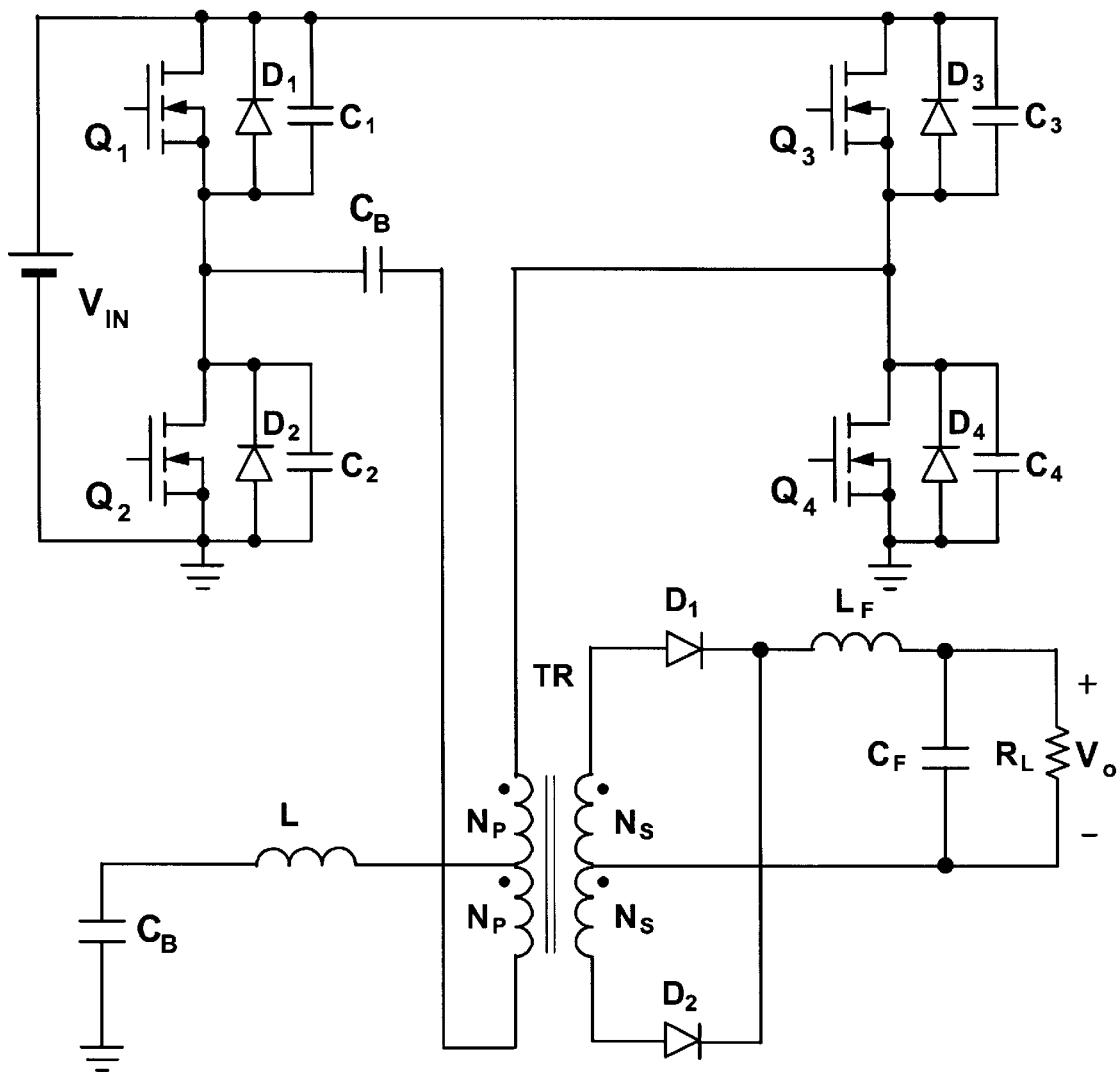
FIG. 15 shows the implementation of the dc/dc FB ZVS-PWM converter derived from the circuit in FIG. 9 when output X is regulated.

FIG. 14 shows the implementation of the FB ZVS-PWM converter according to the circuit in FIG. 11 when Y is regulated output, whereas FIG. 15 shows the circuit in FIG. 11 when X is the regulated output. Both embodiments employ capacitor $C_{B1}$, to implement source $V_1$. It should be noted that the circuit in FIG. 14 uses coupled inductor $L_C$ to store energy for ZVS, whereas inductor L in the circuit in FIG. 15 is uncoupled. In both circuits, voltage source $V_1$ can also be implemented by splitting the rail as it was done in FIG. 13.

Figure 16:
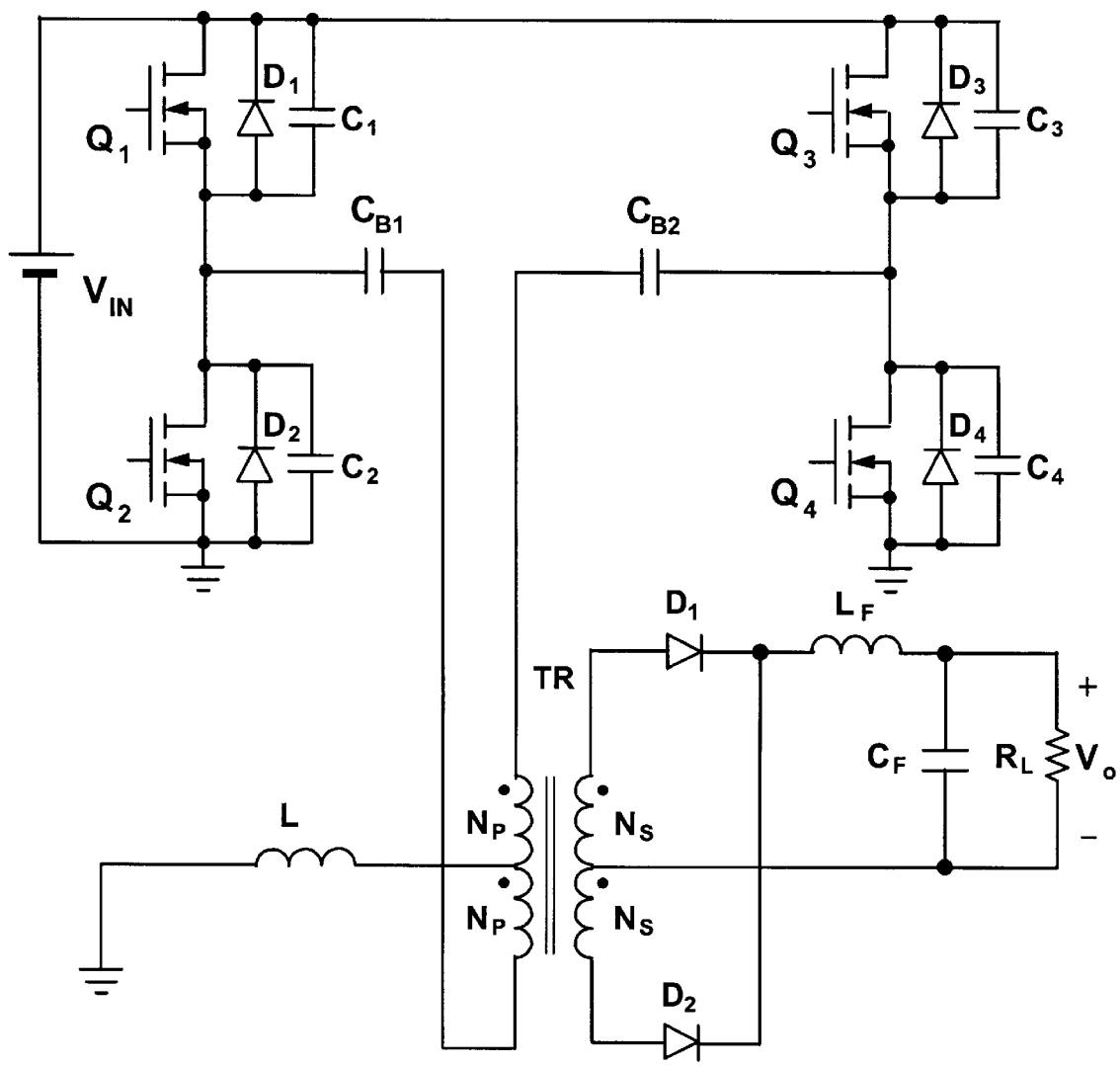
FIG. 16 shows the implementation of the dc/dc FB ZVS-PWM converter derived from the circuit in FIG. 3 when output X is regulated.
Figure 17:
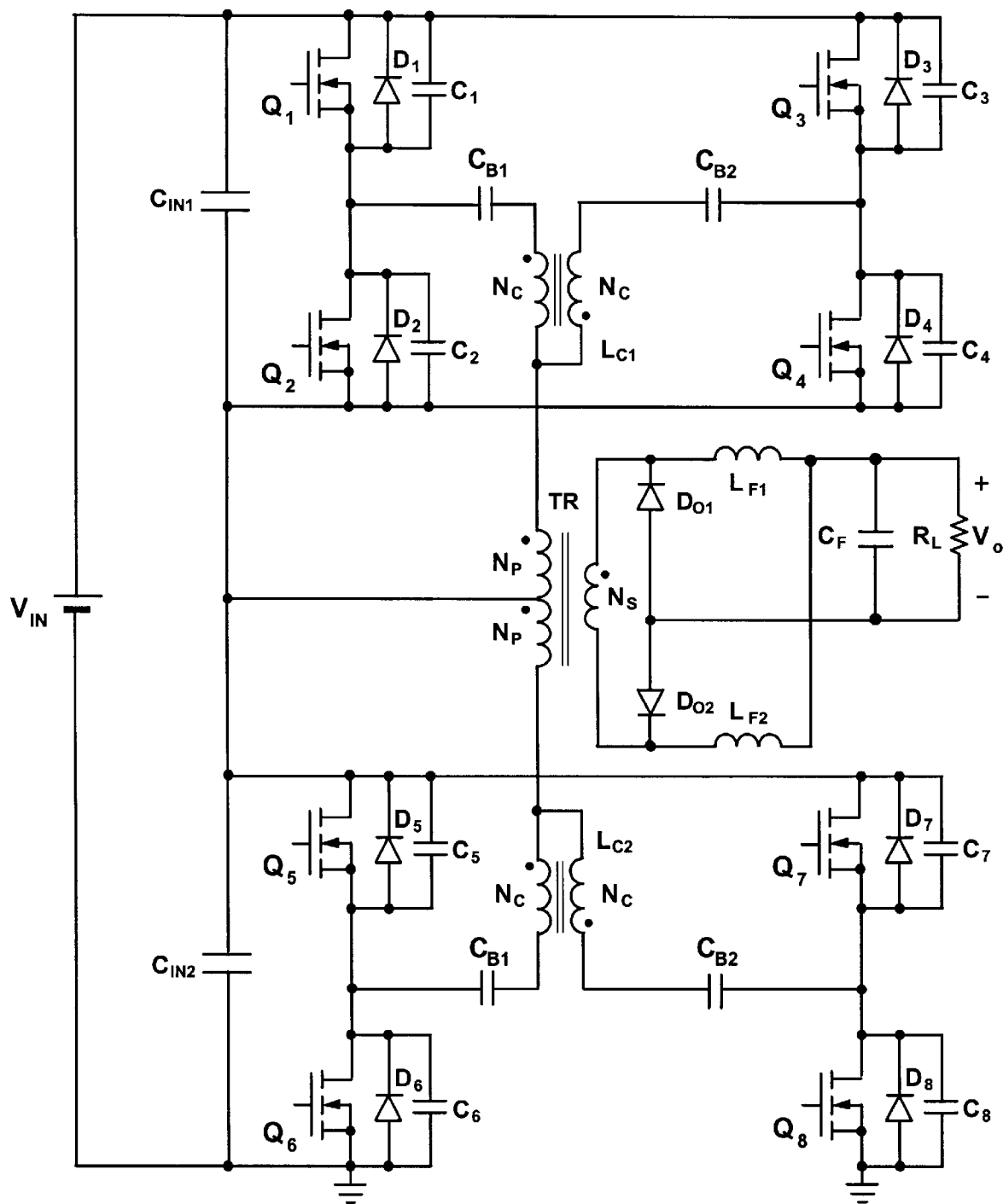
FIG. 17 shows the implementation of a high-power dc/dc converter that employs two FB ZVS-PWM converters that share the same current-doubler rectifier. Each FB ZVS-PWM converter is derived from the circuit in FIG. 3 by regulating output Y.

Finally, FIGS. 16 and 17 show two more implementations of the FB ZVS-PWM converter. The circuit in FIG. 16 is derived from the generalized circuit in FIG. 3 by regulating output X. The circuit in FIG. 17, which is suitable for high-power applications with a high input voltage, employs two FB ZVS-PWM converters as in FIG. 12 that share the same current-doubler rectifier. In this circuit, switch pairs $Q_1$–$Q_6$, $Q_2$–$Q_5$, $Q_3$–$Q_8$, and $Q_4$–$Q_7$ are turned on and off simultaneously.

As already explained, in the circuits of this invention, it is more difficult to achieve ZVS of the switches in one bridge leg than in the other because the energy available for creating the ZVS condition in the two legs is different. Generally, the ZVS condition is harder to create for the switches that are in the bridge leg which utilizes the energy stored in the magnetizing inductance of the transformer in the unregulated output and energy stored in the leakage inductances of the transformers. To achieve ZVS this energy must be at least equal the energy required to discharge the capacitance of the switch which is about to be turned on (and at the same time charge the capacitance of the switch that just has been turned off). At heavier load currents, ZVS is primarily achieved by the energy stored in the leakage inductances of transformers TX and TY. As the load current decreases, the energy stored in the leakage inductances also decreases, whereas the energy stored in the magnetizing inductance of the transformer of the unregulated output increases so that at light loads this magnetizing provides an increasing share of the energy required for ZVS. In fact, at no load, this magnetizing inductance provides the entire energy required to create the ZVS condition. Therefore, if the value of the magnetizing inductance of the transformer in the unregulated output is selected so that ZVS is achieved at no load and maximum input voltage $V_{IN(max)}$, ZVS is achieved in the entire load and input-voltage range.

Neglecting the capacitances of the transformer's windings, magnetizing inductance $L_{MX}$ necessary to achieve ZVS of legging-leg switches in the implementations where output Y is regulated is $$L_{MX} \leq \frac{1}{32Cf_s^2}, \quad (15)$$

whereas, magnetizing inductance $L_{MY}$ required to achieve ZVS of leading-leg switches in the implementations where output X is regulated is $$L_{MY} \leq \frac{1}{128Cf_s^2} \quad (16)$$

where C is the total capacitance across the primary switches (parasitic and external capacitance, if any) in the corresponding legs.

As can be seen from FIG. 5, current $i_{MX}$ flowing through magnetizing inductance $L_{MX}$ introduces a current asymmetry in the two bridge legs. Namely, since in the circuits of this invention that have output Y regulated $i_1=i_2+2i_{MX}$ (as can be derived from Eqs. (3)–(5)), leading leg $S_1$–$S_2$ always carries a higher current than lagging leg $S_3$–$S_4$. On the other hand, for the circuits of this invention that have output X regulated, as for example that shown in FIG. 7, both legs carry the same current. Furthermore, if the current imbalance in the circuits with regulated output Y is significant, i.e., if current $i_2$ in lagging lag S3–S4 is significantly lower than current $i_1$ in leading leg $S_1$–$S_2$, different size switches can be selected for the two legs, which may reduce the cost of the implementation without sacrificing the circuit performance.

Finally, it should be noted that in the circuits of this invention the parasitic ringing on the secondary side is significantly reduced because these circuits do not require increased leakage inductances of the transformers, or a large external to store the required energy for ZVS of the lagging-leg switches. Since the transformers in the circuits of this invention can be made with small leakage inductances, the secondary-side ringing between the leakage inductances of the transformers and the junction capacitance of the rectifier can be greatly reduced. Any residual parasitic ringing can be damped by a small (low-power) snubber circuit.

The control of the circuits of this invention is the same as the control of any other constant-frequency FB ZVS converter. In fact, any of the integrated phase-shift controllers available on the market can be used implement the control of the proposed circuit. However, it should be noted that in the circuits with regulated output Y the maximum output voltage (volt-second product) is obtained when the bridge legs are operated in phase (0° phase shift), whereas the maximum output voltage (volt-second product) for the circuits with regulated output X occurs when the bridge legs are operated in antiphase (180° phase shift). This difference in the control characteristics of the two circuit implementations has a minor effect on the control loop design since a simple control-signal inversion in the voltage control loop solves the problem.

Figure 18:
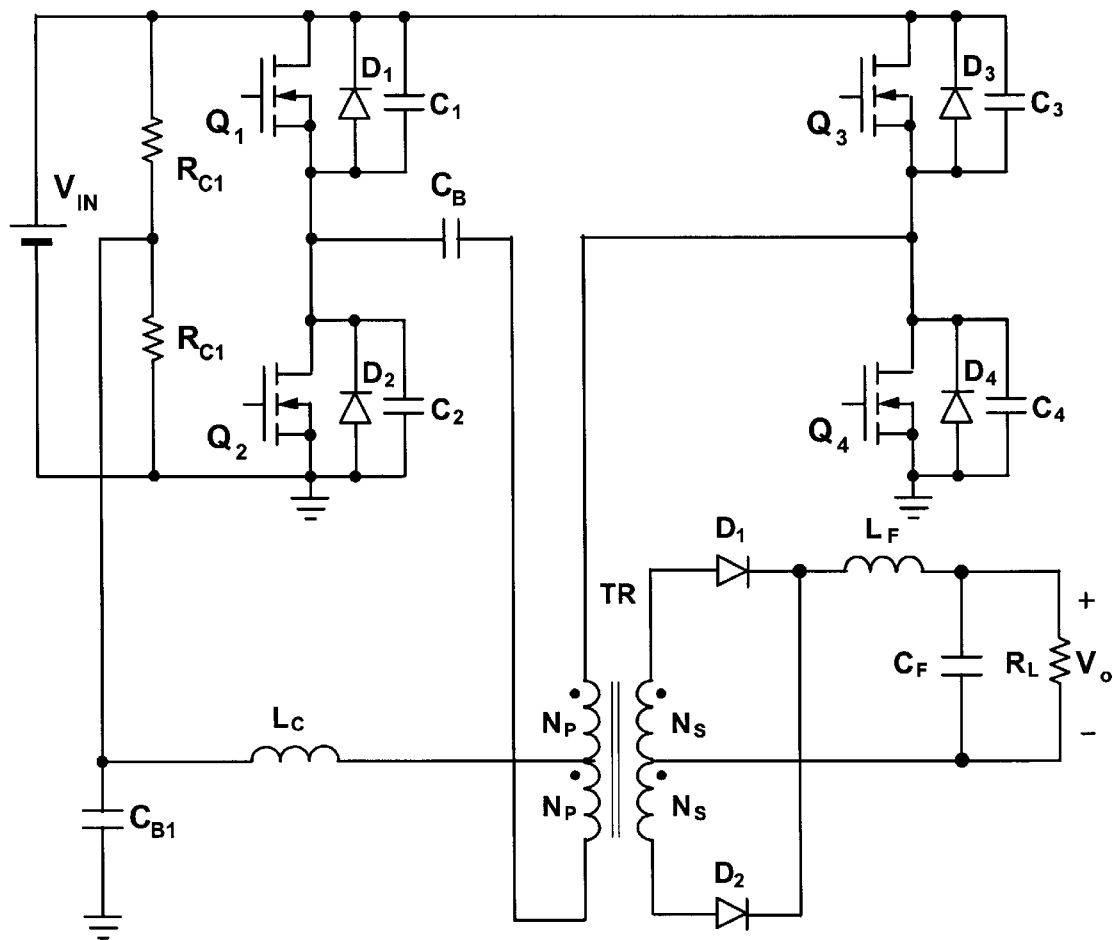
FIG. 18 shows a pre-charging circuit for capacitor $C_{B1}$ for the circuit implementation on FIG. 15.
Figure 19:
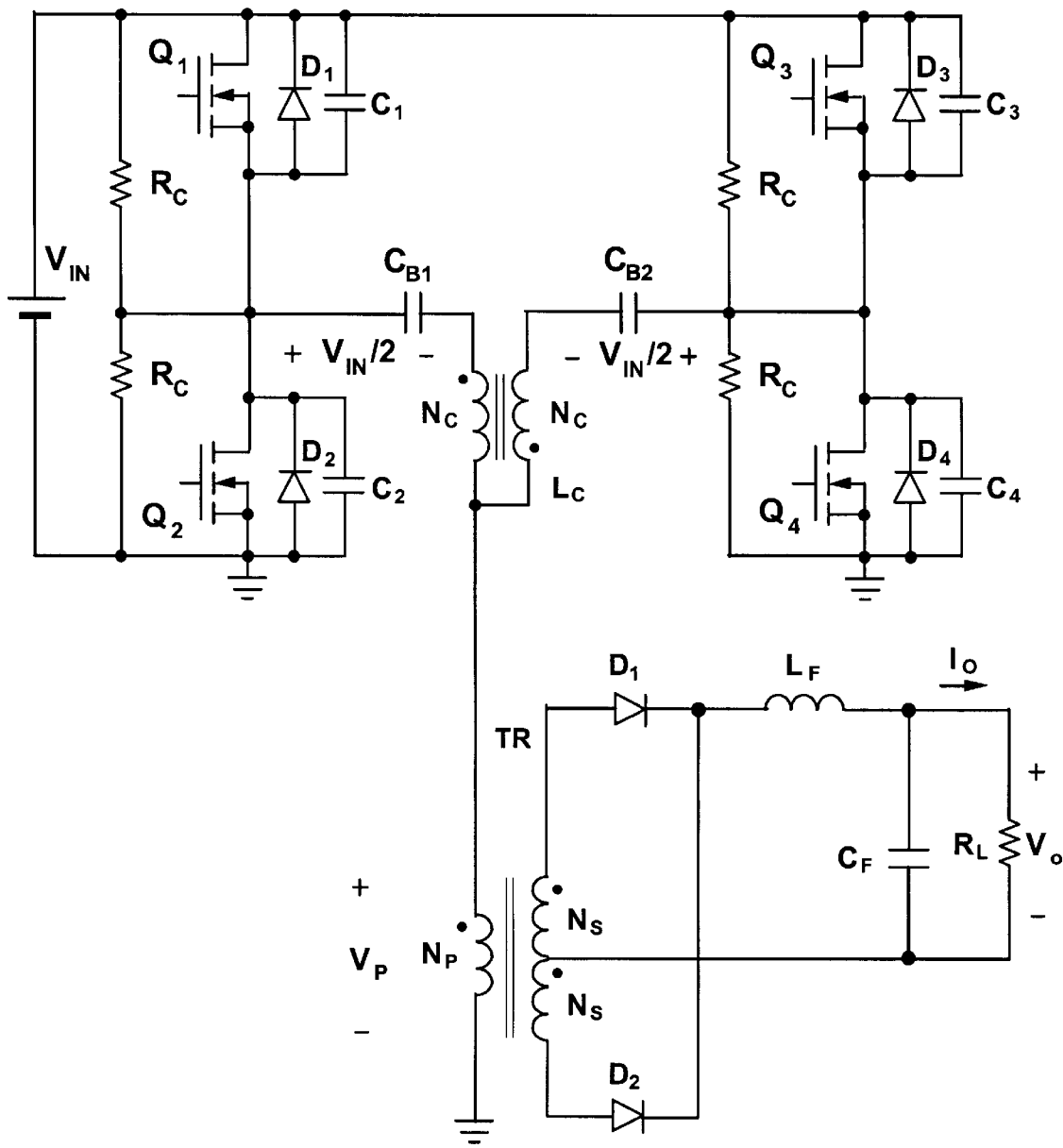
FIG. 19 shows a pre-charging circuit for capacitors $C_{B1}$ and $C_{B2}$ for the circuit implementation in FIG. 2.

Because voltage sources $V_1=V_{IN}/2$ and $V_2=V_{IN}/2$ in FIGS. 3, 9, 10, and 11 are implemented with capacitors $C_{B1}$ and $C_{B2}$, respectively, as shown in FIGS. 2 and 12 through 17, it is necessary to pre-charge these capacitors to $V_{IN}/2$ before the start-up moment. Namely, without pre-charging the voltages of the capacitors are zero, which causes a volt-second imbalance on the windings of the transformers during the start-up. This volt-second imbalance may lead to the saturation of the transformers, which produces excessive currents in the primary that may damage the switches. FIGS. 18 and 19 show examples of pre-charging circuits. FIG. 18 shows a pre-charging circuit implemented with resistors $R_C$ for the circuit shown in FIG. 15, whereas FIG. 19 shows a pre-charging circuit implementation for the circuit in FIG. 2. It should be noted that many other implementations of the pre-charging circuit are possible for any circuit of this invention.

It also should be noted the above detailed descriptions are provided to illustrate specific embodiments of the present invention and are not intended to be limiting. Numerous variations and modifications within the scope of this invention are possible. The present invention is set forth in the following claims.

We claim:

1. A soft-switched, constant-frequency, full-bridge power converter with phase-shift modulation comprising:

an input power source;

a first and second bridge leg each comprising a pair of serially-connected controllable switching devices adapted to connect across said input power source, each of said controllable switching devices comprising a switch, an antiparallel diode coupled across said switch and a capacitor coupled across said switch;

a first and second magnetic device each having a plurality of windings formed around a corresponding magnetic core; said first and second magnetic device coupled to said first and second bridge leg in an arrangement so that when corresponding switches in said first and second bridge leg are open and closed in phase the volt-second product of said windings of said first magnetic device is maximal and the volt-second product of said windings of said second magnetic device is minimal, and when corresponding switches in said first and second bridge leg are open and closed in antiphase the volt-second product of said windings of said first magnetic device is minimal and the volt-second product of said windings of said second magnetic device is maximal;

a plurality of capacitors coupled to said windings of said first and second magnetic devices to prevent their saturation by providing a volt-second balance of said windings;

an output circuit for coupling a load.

2. A power converter as in claim 1 wherein said first magnetic device is arranged as a transformer having primary and secondary windings, and wherein said second magnetic device is arranged as a coupled inductor having two windings that are connected in series, and wherein the magnetizing inductance of said coupled inductor is selected so that the energy stored in said magnetizing inductance is large enough to substantially discharge said output capacitance of each of said switching devices that is about to be turned on so that voltage across said each of said switching devices at the moment of turn-on is substantially reduced in the entire current range of said load.

3. A power converter as in claim 2 wherein said output circuit is coupled to said secondary winding of said transformer.

4. A power converter as in claim 1 wherein said second magnetic device is arranged as a transformer having primary and secondary windings, and wherein said first magnetic device is arranged as an inductor, and wherein the inductance of said inductor is selected so that the energy stored in said inductor is large enough to substantially discharge said output capacitance of said each of said switching devices that is about to be turned on so that voltage across said each of said switching devices that is about to be turned on at the moment of turn-on is substantially reduced in the entire current range of said load.

5. A power converter as in claim 4 wherein said output circuit is coupled to said secondary winding of said transformer.

6. A power converter as in claim 1 further comprising a plurality of resistors for precharging said plurality of capacitors immediately after said power source is applied to said power converter so that said plurality of capacitors provide required voltages for maintaining volt-second products of said windings of said first and second magnetic devices during a start-up period.

7. A power converter as in claim 1 wherein said output circuit is the full-wave rectifier.

8. A power converter as in claim 1 wherein said output circuit is the current doubler.

9. A power converter as in claim 1 wherein said output circuit comprises a filter.

* * * * *